US012662102B2

(12) United States Patent
Kim et al.

(10) Patent No.: US 12,662,102 B2
(45) Date of Patent: Jun. 23, 2026

(54) MOTOR DRIVING REDUNDANCY DEVICE FOR ELECTRONIC PARKING BRAKE

(71) Applicant: HYUNDAI MOBIS CO., LTD., Seoul (KR)

(72) Inventors: Bo Min Kim, Yongin-si (KR); Jae Hyun Park, Yongin-si (KR); Se Hyun Kim, Yongin-si (KR); Byeong Jin Choi, Yongin-si (KR); Cheol Jun Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 154 days.

(21) Appl. No.: 18/603,822

(22) Filed: Mar. 13, 2024

(65) Prior Publication Data

US 2025/0026331 A1     Jan. 23, 2025

(30) Foreign Application Priority Data

Jul. 19, 2023    (KR) .......................... 10-203-0093788

(51) Int. Cl.
*B60T 13/74*        (2006.01)
*B60T 17/18*        (2006.01)

(52) U.S. Cl.
CPC ............ *B60T 17/18* (2013.01); *B60T 13/741* (2013.01); *B60T 2270/402* (2013.01); *B60T 2270/404* (2013.01)

(58) Field of Classification Search
CPC .. B60T 13/741; B60T 17/18; B60T 2270/404; B60T 2270/402

USPC ...................................................... 318/400.26
See application file for complete search history.

(56)                References Cited

U.S. PATENT DOCUMENTS

| | | | | |
|---|---|---|---|---|
| 2011/0109253 A1* | 5/2011 | Hung | ........................ | H02P 7/29 |
| | | | | 318/400.09 |
| 2019/0047615 A1* | 2/2019 | Je | ......................... | B62D 5/0487 |
| 2022/0352833 A1* | 11/2022 | Gourari | ................. | B60L 3/0092 |
| 2022/0388487 A1* | 12/2022 | Hwang | ..................... | B60T 7/12 |
| 2023/0032084 A1* | 2/2023 | Ha | .......................... | B60R 16/00 |

FOREIGN PATENT DOCUMENTS

KR      10-2022-0167072 A      12/2022

* cited by examiner

*Primary Examiner* — Gabriel Agared
(74) *Attorney, Agent, or Firm* — Morgan, Lewis & Bockius LLP

(57)            ABSTRACT

A motor driving redundancy device for an electronic parking brake includes a first motor-driving module configured to supply current to a motor, a first driver module configured to control the first motor-driving module, a second motor-driving module configured to drive the motor, a second driver module configured to control the second motor-driving module, a monitoring module configured to monitor a status of the first motor-driving module and the second motor-driving module, and a processor configured to, when a failure is detected in either the first motor-driving module or the second motor-driving module by the monitoring module, control at least one of the first motor-driving module or the second motor-driving module to drive the motor.

10 Claims, 9 Drawing Sheets

FIG.3A

| Classification | 1st motor-driving module | | | | | |
|---|---|---|---|---|---|---|
| | TR1 | TR2 | TR3 | TR4 | SW1 | SW2 |
| Before/After EPB operation | Off | Off | Off | Off | On | On |
| Apply | On | Off | Off | On | On | On |
| Release | Off | On | On | Off | On | On |

FIG.3B

| Classification | 2nd motor-driving module | | | | | |
|---|---|---|---|---|---|---|
| | TR5 | TR6 | TR7 | TR8 | SW3 | SW4 |
| Before/After EPB operation | Off | Off | Off | Off | Off | Off |
| Apply | Off | Off | Off | Off | Off | Off |
| Release | Off | Off | Off | Off | Off | Off |

FIG.4A

| Classification | 1st motor-driving module | | | | | |
|---|---|---|---|---|---|---|
| | TR1 | TR2 | TR3 | TR4 | SW1 | SW2 |
| Before/After EPB operation | Off | Off | Off | Off | Off | Off |
| Apply | Off | Off | Off | Off | Off | Off |
| Release | Off | Off | Off | Off | Off | Off |

FIG.4B

| Classification | 2nd motor-driving module | | | | | |
|---|---|---|---|---|---|---|
| | TR5 | TR6 | TR7 | TR8 | SW3 | SW4 |
| Before/After EPB operation | Off | Off | Off | Off | On | On |
| Apply | On | Off | Off | On | On | On |
| Release | Off | On | On | Off | On | On |

FIG.5A

| Classification | 1st motor-driving module | | | | | |
|---|---|---|---|---|---|---|
| | TR1 | TR2 | TR3 | TR4 | SW1 | SW2 |
| Before/After EPB operation | Off | Off | Off | Off | On | Off |
| Apply1 | On | Off | Off | Off | On | Off |
| Release1 | Off | On | Off | Off | On | Off |
| Before/After EPB operation | Off | Off | Off | Off | Off | On |
| Apply2 | Off | Off | Off | On | Off | On |
| Release2 | Off | Off | On | Off | Off | On |

FIG.5B

| Classification | 2nd motor-driving module | | | | | |
|---|---|---|---|---|---|---|
| | TR5 | TR6 | TR7 | TR8 | SW3 | SW4 |
| Before/After EPB operation | Off | Off | Off | Off | Off | On |
| Apply1 | Off | Off | Off | On | Off | On |
| Release1 | Off | Off | On | Off | Off | On |
| Before/After EPB operation | Off | Off | Off | Off | On | Off |
| Apply2 | On | Off | Off | Off | On | Off |
| Release2 | Off | On | Off | Off | On | Off |

1

MOTOR DRIVING REDUNDANCY DEVICE FOR ELECTRONIC PARKING BRAKE

CROSS-REFERENCE TO RELATED APPLICATION

This application claims priority from and the benefit of Korean Patent Application No. 10-2023-0093788, filed on Jul. 19, 2023, which is hereby incorporated by reference for all purposes as if set forth herein.

BACKGROUND

Field

Exemplary embodiments of the present disclosure relate to a motor driving redundancy device for an electronic parking brake.

Discussion of the Background

Recently released vehicles are equipped with electronic parking brakes (EPB), which electronically control the actuation of parking brakes.

The EPB automatically activates or deactivates the parking brake based on the control judgment of electronic control units (ECUs), performing simple switch operations or overall control, without a driver's manual operation on the parking brake.

The EPB includes an actuator for driving a motor to generate braking force, and a micro controller unit (MCU) for controlling the actuator.

A controller of the EPB includes an MCU that judges the situation and issues control commands, a drive Driver IC that outputs actual control signals, and an H-bridge that supplies current to drive the motor.

Since a single H-bridge operates a single motor, there is a problem in that if one of the transistors in an H-bridge circuit fails, the entire system of the electronic parking brake will not function normally due to that single failure.

The background technology of the present disclosure is disclosed in Unexamined Korean Patent Publication No. 10-2022-0167072 (published on Dec. 20, 2022 and entitled 'Electronic Parking Brake Control Device and Method').

SUMMARY

Various embodiments are directed to a motor driving redundancy device for an electronic parking brake, capable of ensuring the reliability of an electronic parking brake by implementing redundancy for current supply to a motor.

In an embodiment, there is provided a motor driving redundancy device for an electronic parking brake, the device including: a first motor-driving module configured to supply current to a motor; a first driver module configured to control the first motor-driving module; a second motor-driving module configured to drive the motor; a second driver module configured to control the second motor-driving module; a monitoring module configured to monitor a status of the first motor-driving module and the second motor-driving module; and a processor configured to, if a failure is detected in either the first motor-driving module or the second motor-driving module by the monitoring module, control at least one of the first motor-driving module or the second motor-driving module to drive the motor.

The first motor-driving module may include: first to fourth transistors constituting an H-bridge; a first cut-off switch configured to cut off current applied to the motor from the first transistor and the second transistor; and a second cut-off switch configured to cut off current applied to the motor from the third transistor and the fourth transistor, and the second motor-driving module may include: fifth to eighth transistors constituting an H-bridge; a third cut-off switch configured to cut off current applied to the motor from the fifth transistor and the sixth transistor; and a fourth cut-off switch configured to cut off current applied to the motor from the seventh transistor and the eighth transistor.

The processor may be configured to, if a failure occurs in at least one of the first transistor or the second transistor, control the fifth transistor and the sixth transistor, and the third transistor and the fourth transistor, or otherwise the second motor-driving module to drive the motor.

The processor may be configured to, if a failure occurs in at least one of the third transistor or the fourth transistor, control the seventh transistor and the eighth transistor, and the first transistor and the second transistor, or otherwise the second motor-driving module to drive the motor.

The monitoring module may include: a first monitoring section configured to monitor a status of the first transistor to the fourth transistor; and a second monitoring section configured to monitor a status of the fifth transistor to the eighth transistor.

The first monitoring section may include: a first-1 monitoring section connected to a first power input of the motor via a node between the first transistor and the second transistor; and a first-2 monitoring section connected to a second power input of the motor via a node between the third transistor and the fourth transistor, and the second monitoring section may include: a second-1 monitoring section connected to a first power input of the motor via a node between the fifth transistor and the sixth transistor; and a second-2 monitoring section connected to a second power input of the motor via a node between the seventh transistor and the eighth transistor.

The processor may be configured to control the first driver module to apply a voltage to one side of the H-bridge circuit of the first motor-driving module and to determine a failure of the first motor-driving module depending on a voltage on the other side of the H-bridge circuit, detected by the monitoring module, or the processor may be configured to control the second driver module to apply a voltage to one side of the H-bridge circuit of the second motor-driving module and to determine a failure of the second motor-driving module depending on a voltage on the other side of the H-bridge circuit, detected by the monitoring module.

The processor may be configured to control the first driver module to connect a pull-up source to one side of the H-bridge circuit of the first motor-driving module and to determine a failure of the first motor-driving module depending on a voltage on the other side of the H-bridge circuit, detected by the monitoring module, or the processor may be configured to control the second driver module to connect a pull-up source to one side of the H-bridge circuit of the second motor-driving module and to determine a failure of the second motor-driving module depending on a voltage on the other side of the H-bridge circuit, detected by the monitoring module.

The processor may be configured to control the first driver module to connect a pull-down source to one side of the H-bridge circuit of the first motor-driving module and to determine a failure of the first motor-driving module depending on a voltage on the other side of the H-bridge circuit, detected by the monitoring module, or the processor may be configured to control the second driver module to connect a pull-down source to one side of the H-bridge circuit of the second motor-driving module and to determine a failure of the second motor-driving module depending on a voltage on the other side of the H-bridge circuit, detected by the monitoring module.

The processor may be configured to, if the first motor-driving module is in a failure condition, determine a failure of at least one of the first transistor to the fourth transistor after turning off at least one of the first cut-off switch or the second cut-off switch, or to, if the second motor-driving module is in a failure condition, determine a failure of at least one of the fifth transistor to the eighth transistor after turning off at least one of the third cut-off switch or the fourth cut-off switch.

In the motor driving redundancy device of an electronic parking brake according to an aspect of the present disclosure, the current supply to a motor is duplicated to ensure the stability of the electronic parking brake.

BRIEF DESCRIPTION OF THE DRAWINGS

FIGS. 3A, 3B, 4A, 4B, 5A and 5B are diagrams illustrating exemplary operations of the motor driving redundancy device for an electronic parking brake according to an embodiment of the present disclosure.

DETAILED DESCRIPTION OF THE ILLUSTRATED EMBODIMENTS

Figure 1:
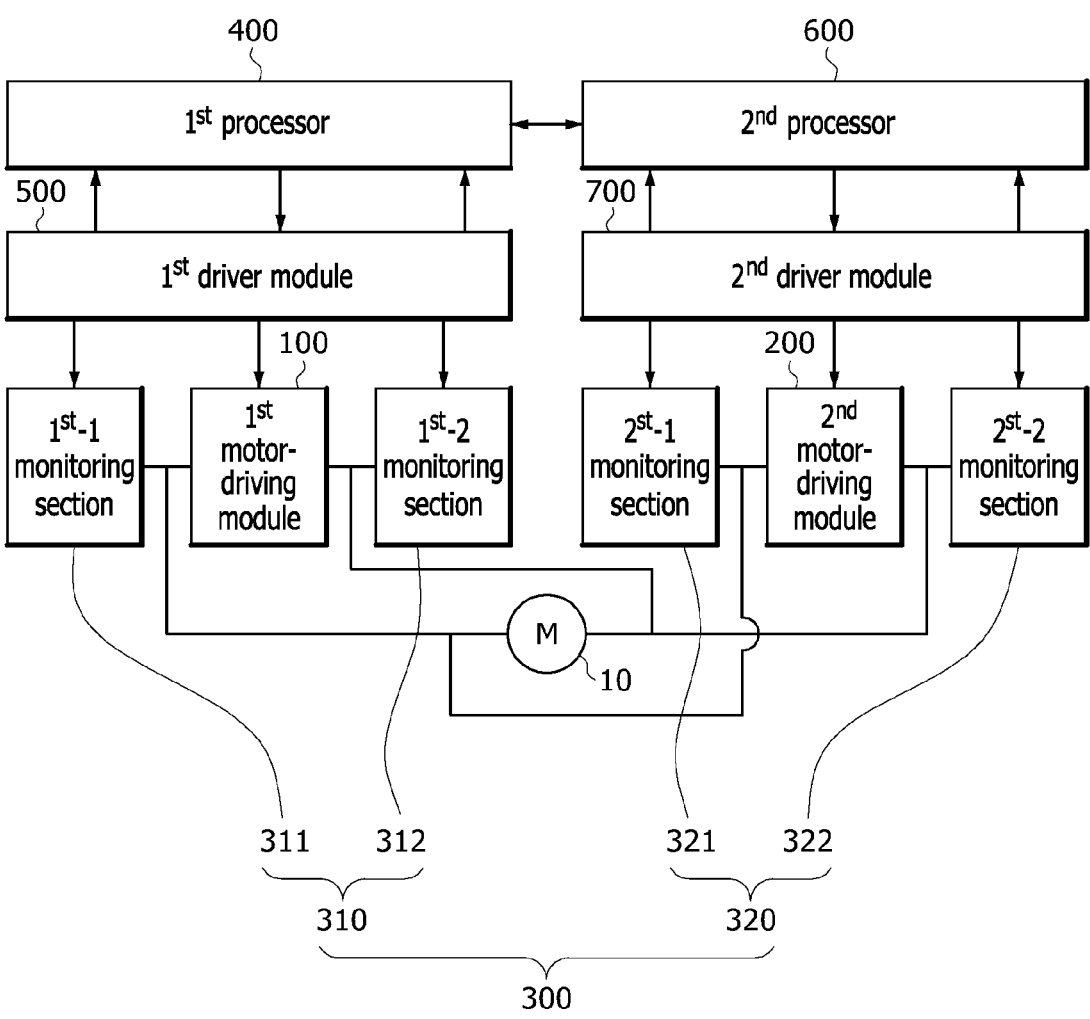
FIG. 1 is a block diagram illustrating a motor driving redundancy device for an electronic parking brake according to an embodiment of the present disclosure.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising"

or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

Hereinafter, embodiments of a motor driving redundancy device for an electronic parking brake according to the present disclosure will be described with reference to the accompanying drawings. In the description, the thicknesses of the lines or the sizes of the components illustrated in the drawings may be exaggerated for clarity and convenience of explanation. In addition, the terms to be described later are terms defined in consideration of functions in the present disclosure, which may vary depending on the intention of a user or an operator, or a usual practice in the art. Therefore, definitions of these terms should be made based on the entire contents of this specification.

Figure 2:
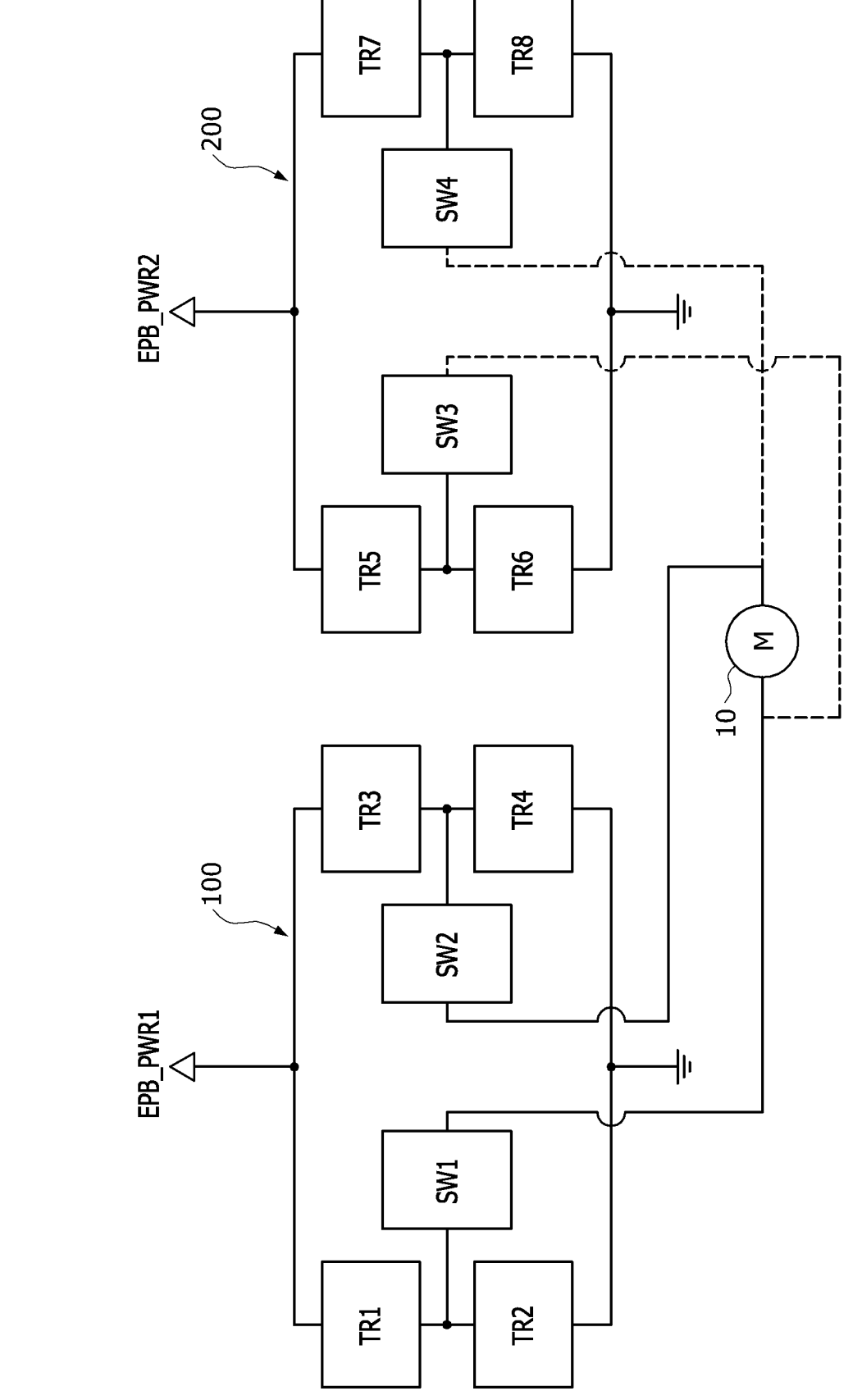
FIG. 2 is a block diagram illustrating a first motor-driving module and a second motor-driving module according to an embodiment of the present disclosure.

FIG. 1 is a block diagram illustrating a motor driving redundancy device for an electronic parking brake according to an embodiment of the present disclosure, and FIG. 2 is a block diagram illustrating a first motor-driving module and a second motor-driving module according to an embodiment of the present disclosure.

Referring to FIG. 1, the motor driving redundancy device for an electronic parking brake includes a first motor-driving module 100, a second motor-driving module 200, a monitoring module 300, a first processor 400, a first driver module 500, a second processor 600, and a second driver module 700.

The first motor-driving module 100 supplies current to a motor 10 of an electronic parking brake (EPB) for driving the EPB motor.

Referring to FIG. 2, the first motor-driving module 100 includes a first transistor TR1 to a fourth transistor TR4, a first cut-off switch SW1, and a second cut-off switch SW2. The first transistor TR1 to the fourth transistor TR4 constitute an H-bridge circuit.

In the H-bridge circuit, the first transistor TR1 and the second transistor TR2 are connected in series, and the third transistor TR3 and the fourth transistor TR4 are connected in series.

A node between the first transistor TR1 and the second transistor TR2 is connected to a first power input of the motor 10.

A node between the third transistor TR3 and the fourth transistor TR4 is connected to a second power input of the motor 10.

The first transistor TR1 to the fourth transistor TR4 are turned on/off depending on a driving signal input from the first processor 400. The motor 10 is driven by the current input according to the on/off of the first transistor TR1 to the fourth transistor TR4.

The first cut-off switch SW1 is connected between the node between the first transistor TR1 and the second transistor TR2 and the first power input of the motor 10. The first cut-off switch SW1 cuts off the current applied to the motor 10 from the first transistor TR1 and the second transistor TR2.

The second cut-off switch SW2 is connected between the node between the third transistor TR3 and the fourth transistor TR4 and the second power input of the motor 10. The second cut-off switch SW2 cuts off the current applied to the motor 10 from the third transistor TR3 and the fourth transistor TR4.

The first driver module 500 controls the first motor-driving module 100, namely the first transistor TR1 to the fourth transistor TR4, the first cut-off switch SW1, and the second cut-off switch SW2, according to a control signal from the first processor 400.

The second motor-driving module 200 includes a fifth transistor TR5 to an eighth transistor TR8, a third cut-off switch SW3, and a fourth cut-off switch SW4. The fifth transistor TR5 to the eighth transistor TR8 constitute an H-bridge circuit.

In the H-bridge circuit, the fifth transistor TR5 and the sixth transistor TR6 are connected in series, and the seventh transistor TR7 and the eighth transistor TR8 are connected in series.

A node between the fifth transistor TR5 and the sixth transistor TR6 is connected to the first power input of the motor 10.

A node between the seventh transistor TR7 and the eighth transistor TR8 is connected to the second power input of the motor 10.

The fifth transistor TR5 to the eighth transistor TR8 are turned on/off depending on a driving signal input from the second processor 600. The motor 10 is driven by the current input according to the on/off of the fifth transistor TR5 to the eighth transistor TR8.

The third cut-off switch SW3 is connected between the node between the fifth transistor TR5 and the sixth transistor TR6 and the first power input of the motor 10. The third cut-off switch SW3 cuts off the current applied to the motor 10 from the fifth transistor TR5 and the sixth transistor TR6.

The fourth cut-off switch SW4 is connected between the node between the seventh transistor TR7 and the eighth transistor TR8 and the second power input of the motor 10. The fourth cut-off switch SW4 cuts off the current applied to the motor 10 from the seventh transistor TR7 and the eighth transistor TR8.

For driving the motor, the first motor-driving module 100 and the second motor-driving module 200 are duplicated to stably supply current to the motor 10.

The second driver module 700 controls the second motor-driving module 200, namely the fifth transistor TR5 to the eighth transistor TR8, the third cut-off switch SW3, and the fourth cut-off switch SW4, according to a control signal from the second processor 600.

The monitoring module 300 monitors the status of the first motor-driving module 100, the second motor-driving module 200, and the motor 10.

In one embodiment, the monitoring module 300 may be an electric circuit.

The monitoring module 300 includes a first monitoring section 310 and a second monitoring section 320.

The first monitoring section 310 monitors the status of the first transistor TR1 to the fourth transistor TR4, and the motor 10.

The first monitoring section 310 includes a first-1 monitoring section 311 and a first-2 monitoring section 312.

The first-1 monitoring section 311 is connected to a node between the first transistor TR1 and the second transistor TR2. The first-1 monitoring section 311 detects a voltage Vmon applied to the node between the first transistor TR1 and the second transistor TR2 to determine whether the first transistor TR1, the second transistor TR2, and the motor 10 are normal.

The first-2 monitoring sections 312 is connected to a node between the third transistor TR3 and the fourth transistor TR4. The first-2 monitoring section 312 detects a voltage Vmon applied to the node between the third transistor TR3 and the fourth transistor TR4 to determine whether the third transistor TR3, the fourth transistor TR4, and the motor 10 are normal.

The second monitoring section 320 monitors the status of the fifth transistor TR5 to the eighth transistor TR8, and the motor 10.

The second monitoring section 320 includes a second-1 monitoring section 321 and a second-2 monitoring section 322.

The second-1 monitoring section 321 is connected to a node between the fifth transistor TR5 and the sixth transistor TR6. The second-1 monitoring section 321 detects a voltage Vmon applied to the node between the fifth transistor TR5 and the sixth transistor TR6 to determine whether the fifth transistor TR5, the sixth transistor TR6, and the motor 10 are normal.

The second-2 monitoring section 322 is connected to a node between the seventh transistor TR7 and the eighth transistor TR8. The second-2 monitoring section 322 detects a voltage Vmon applied to the node between the seventh transistor TR7 and the eighth transistor TR8 to determine whether the seventh transistor TR7, the eighth transistor TR8, and the motor 10 are normal.

The first processor 400 and the second processor 600 detect a failure of the first motor-driving module 100 or the second motor-driving module 200 through the monitoring module 300.

The first processor 400 and the second processor 600 share control information with each other.

The first processor 400 transmits to the second processor 600 the switching state of the first motor-driving module 100 via the first driver module 500.

The second processor 600 transmits to the first processor 400 the switching state of the second motor-driving module 200 via the second driver module 700.

Based on the monitoring result of the monitoring module 300, the first processor 400 controls the first motor-driving module 100 to drive the motor 10, and the second processor 600 controls the second motor-driving module 200 to drive the motor 10.

Although the present embodiment describes the first processor 400 and the second processor 600 controlling the first driver module 500 and the second driver module 700 by way of example, the technical scope of the present disclosure is not limited thereto.

For example, a single processor may control both the first driver module 500 and the second driver module 700, i.e., the first processor 400 may control both the first driver module 500 and the second driver module 700. In this case, the second processor 600 may perform the operation of the first processor 400 depending on whether the first processor 400 fails.

Additionally, the second processor 600 may control both the first driver module 500 and the second driver module 700. In this case, the first processor 400 may perform the operation of the second processor 600 depending on whether the second processor 600 fails.

Furthermore, a single processor (not shown) may control both the first driver module 500 and the second driver module 700.

In this embodiment, the first processor 400 and the second processor 600 are described as controlling the first driver module 500 and the second driver module 700, respectively, in conjunction with each other.

FIGS. 3 to 5 are diagrams illustrating exemplary operations of the motor driving redundancy device for an electronic parking brake according to an embodiment of the present disclosure.

In FIGS. 3A and 3B, a switching state of the first motor-driving module 100 and the second motor-driving module 200 is illustrated when the first motor-driving module 100 is in a normal state (a state independent of whether the second motor-driving module 200 is normal).

Referring to FIGS. 3A and 3B, when the first motor-driving module 100 is in a normal state, the second processor 600 turns off the fifth transistor TR5 to the eighth transistor TR8 of the second motor-driving module 200, and turns off the third cut-off switch SW3 and the fourth cut-off switch SW4.

In this state, the first processor 400 turns on the first cut-off switch SW1 and the second cut-off switch SW2, and in Apply-on and Release-on states, controls the first transistor TR1 to the fourth transistor TR4 of the first motor-driving module 100 to drive the motor 10.

The method of driving the motor 10 through current control is apparent to those skilled in the art, so a detailed description thereof will be omitted here.

FIGS. 4A and 4B illustrate a switching state of the first motor-driving module 100 and the second motor-driving module 200 when the first motor-driving module 100 is in a failure state and the second motor-driving module 200 is in a normal state.

Referring to FIGS. 4A and 4B, when the first motor-driving module 100 is in a failure state and the second motor-driving module 200 is in a normal state, the first processor 400 turns off the first transistor TR1 to the fourth transistor TR4 of the first motor-driving module 100, and turns off the first cut-off switch SW1 and the second cut-off switch SW2.

In this state, the second processor 600 turns on the third cut-off switch SW3 and the fourth cut-off switch SW4, and in Apply-on and Release-on states, controls the fifth transistor TR5 to the eighth transistor TR8 of the second motor-driving module 200 to drive the motor 10.

FIGS. 5A and 5B illustrate a switching state of the first motor-driving module 100 and the second motor-driving module 200 when at least one of the third transistor TR3 and the fourth transistor TR4 of the first motor-driving module

100 fails and at least one of the fifth transistor TR5 and the sixth transistor TR6 of the second motor-driving module 200 fails.

Referring to FIGS. 5A and 5B, when at least one of the third transistor TR3 and the fourth transistor TR4 of the first motor-driving module 100 fails, and at least one of the fifth transistor TR5 and the sixth transistor TR6 of the second motor-driving module 200 fails, the first processor 400 turns off the third transistor TR3 and the fourth transistor TR4 of the first motor-driving module 100, and turns off the second cut-off switch SW2. Further, the second processor 600 turns off the fifth transistor TR5 and the sixth transistor TR6 of the second motor-driving module 200, and turns off the third cut-off switch SW3.

In this state, the first processor 400 and the second processor 600 turn on the first cut-off switch SW1 and the fourth cut-off switch SW4, and in Apply 1-on and Release 1-on states, control the first transistor TR1 and the second transistor TR2 of the first motor-driving module 100 and the seventh transistor TR7 and the eighth transistor TR8 of the second motor-driving module 200 to drive the motor 10. The first transistor TR1 and the second transistor TR2, and the seventh transistor TR7 and the eighth transistor TR8 of the second motor-driving module 200 consequently constitute an H-bridge circuit.

Furthermore, when at least one of the first transistor TR1 and the second transistor TR2 of the first motor-driving module 100 fails, and at least one of the seventh transistor TR7 and the eighth transistor TR8 of the second motor-driving module 200 fails, the first processor 400 turns off the first transistor TR1 and the second transistor TR2 of the first motor-driving module 100, and turns off the first cut-off switch SW1. The second processor 600 also turns off the seventh transistor TR7 and the eighth transistor TR8 of the second motor-driving module 200, and turns off the fourth cut-off switch SW4.

In this state, the first processor 400 and the second processor 600 turn on the second cut-off switch SW2 and the third cut-off switch SW3, and in Apply 2-on and Release 2-on states, control the third transistor TR3 and the fourth transistor TR4 of the first motor-driving module 100 and the fifth transistor TR5 and the sixth transistor TR6 of the second motor-driving module 200 to drive the motor 10. The third transistor TR3 and the fourth transistor TR4 of the first motor-driving module 100 and the fifth transistor TR5 and the sixth transistor TR6 of the second motor-driving module 200 consequently constitute an H-bridge circuit.

On the other hand, the first processor 400 and the second processor 600 may, in connection with each other, monitor the status of the first motor-driving module 100, the second motor-driving module 200, and the motor 10 before the operation of the electronic parking brake, according to the monitoring result of the monitoring module 300.

For example, the first driver module 500 or the second driver module 700 may apply a reference voltage to the H-bridge circuit of the first motor-driving module 100 or the H-bridge circuit of the second motor-driving module 200, respectively. Alternatively, the first driver module 500 or the second driver module 700 may connect pull-up power or pull-down power to the first motor-driving module 100 or the second motor-driving module 200, respectively. This allows a failure of each of the first motor-driving module 100 and the second motor-driving module 200 to be detected via a voltage detected on the H-bridge circuit of the first motor-driving module 100 or the second motor-driving module 200.

When performing monitoring on the first motor-driving module 100, the first processor 400 applies a voltage to one side of the H-bridge circuit of the first motor-driving module 100 via the first driver module 500, and determines whether the first motor-driving module 100 fails, according to the voltage on the other side of the H-bridge circuit detected by the monitoring module 300.

In addition, the first processor 400 connects a pull-up source or a pull-down source to one side of the H-bridge circuit of the first motor-driving module 100 and determines whether the first motor-driving module 100 fails, according to the voltage on the other side of the H-bridge circuit detected by the monitoring module. At this time, the processor 400 turns on the first cut-off switch SW1 and the second cut-off switch SW2 so that the H-bridge circuit is connected to the motor 10. This may be applied to the second motor-driving module 200 in the same manner.

Further, when performing monitoring on the first motor-driving module 100, the second processor 600 connects a pull-up source or a pull-down source to one side of the H-bridge circuit of the second motor-driving module 200 via the second driver module 700 and determines whether the first motor-driving module 100 fails, according to the voltage on the other side of the H-bridge circuit of the first motor-driving module 100 detected by the monitoring module 300. At this time, the first processor 400 turns on the second cut-off switch SW2 and the second processor 600 turns on the third cut-off switch SW3 so that the fifth transistor TR5 and the sixth transistor TR6 of the second motor-driving module 200 and the third transistor TR3 and the fourth transistor TR4 of the first motor-driving module 100 may constitute an H-bridge circuit. This may be applied to the second motor-driving module 200 in the same manner.

As such, if a failure is detected for each of the first motor-driving module 100 and the second motor-driving module, the first processor 400 and the second processor 600 determine the failure for each transistor in the H-bridge of the first motor-driving module 100 and the second motor-driving module 200.

Hereinafter, the process of monitoring the failure of the first motor-driving module 100 and the second motor-driving module 200 will be described in detail with reference to FIGS. 6 to 8.

Figure 6:
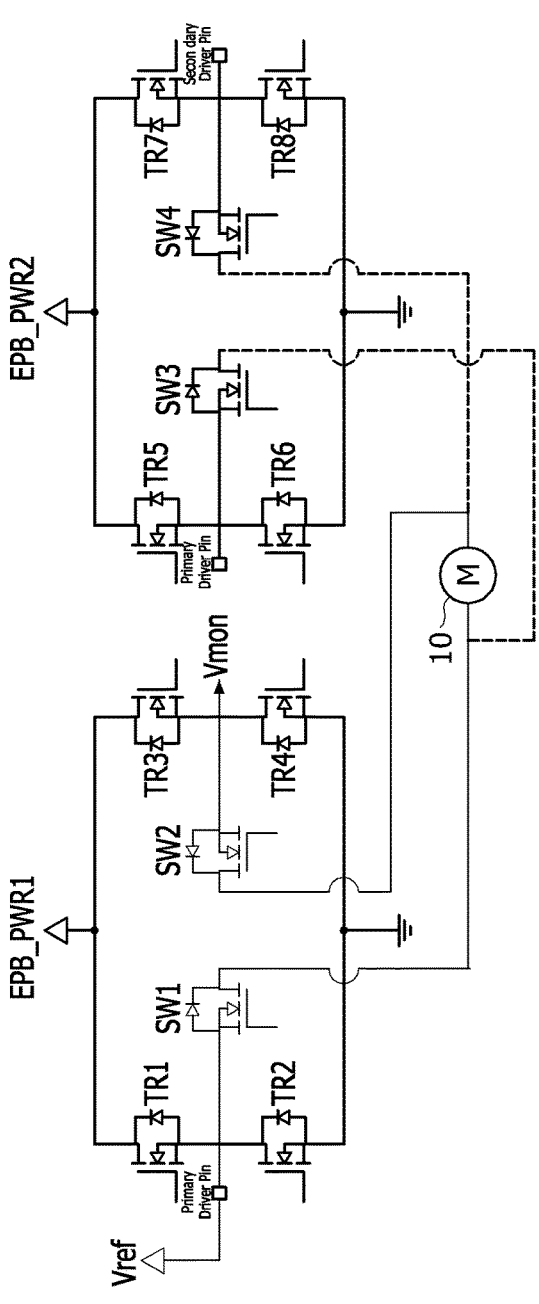
FIGS. 6, 7, 8A and 8B are diagrams illustrating examples of monitoring a failure of the first motor-driving module or the second motor-driving module according to an embodiment of the present disclosure.
Figure 7:
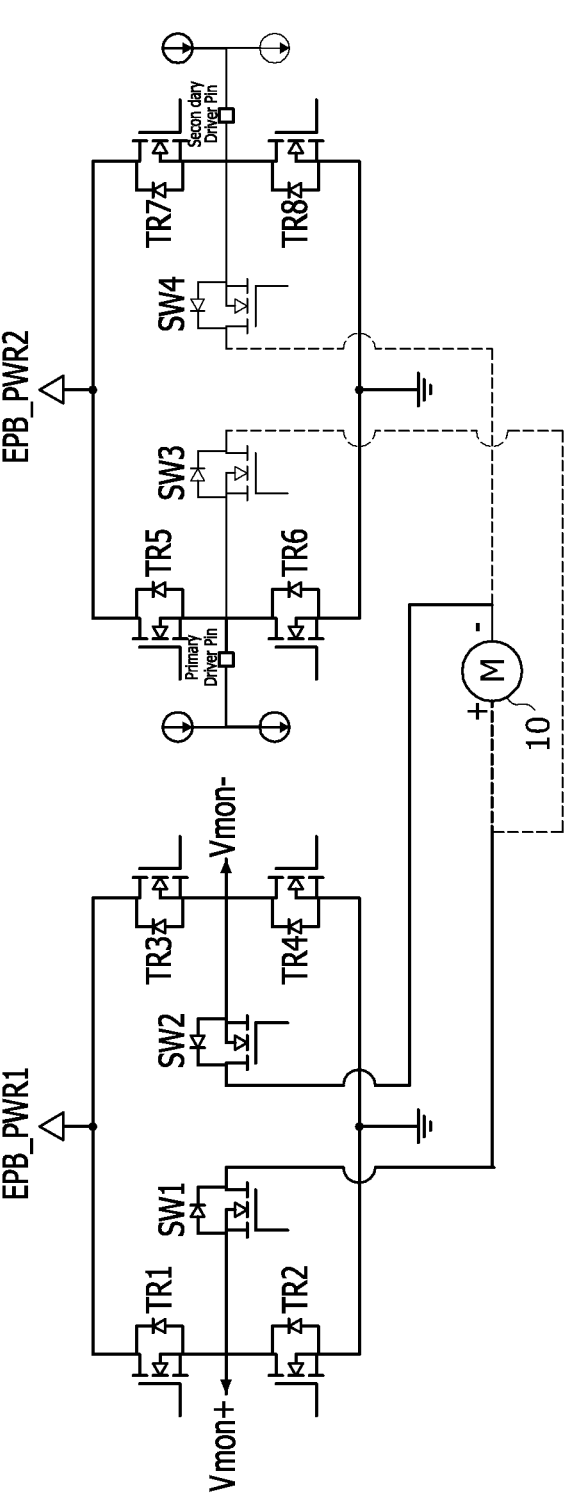

FIGS. 6 to 8 are diagrams illustrating examples of monitoring a failure of the first motor-driving module or the second motor-driving module according to an embodiment of the present disclosure.

Referring to FIG. 6, the first processor 400 turns on the first cut-off switch SW1 and the second cut-off switch SW2.

The first processor 400 may determine whether the first motor-driving module 100 or the motor 10 is in a normal state, using a voltage input from the first-1 monitoring section 311 and a voltage output from the first-2 monitoring section 312. In this case, the first processor 400 determines whether at least one of the first transistor TR1 and the second transistor TR2 has a battery short or ground short failure, or whether the motor 10 has an open-state failure, depending on the voltage measured by the first-1 monitoring section 311. Further, the first processor 400 determines whether at least one of the third transistor TR3 and the fourth transistor TR4 has a battery short or ground short failure, or whether the motor 10 has an open-state failure, depending on the voltage measured by the first-2 monitoring section 312.

First, the first processor 400 applies a voltage Vref to the node between the first transistor TR1 and the second transistor TR2 of the first motor-driving module 100 via the first driver module 500, and detects a voltage Vmon across the third transistor TR3 and the fourth transistor TR4 via the first-2 monitoring section 312.

The first processor 400 determines that the first motor-driving module 100 is in a normal state if the voltage Vmon across the third transistor TR3 and the fourth transistor TR4 detected by the first-2 monitoring section 312 is equal to the voltage Vref applied to the node between the first transistor TR1 and the second transistor TR2.

If the voltage Vmon across the third transistor TR3 and the fourth transistor TR4 is different from the voltage Vref applied to the node between the first transistor TR1 and the second transistor TR2, the first processor 400 determines a motor open failure, that is, the motor has been current-disconnected.

If the voltage Vmon across the third transistor TR3 and the fourth transistor TR4 is a ground voltage, the first processor 400 determines a ground short or second transistor TR2 and fourth transistor TR4 short failure.

If the voltage Vmon across the third transistor TR3 and the fourth transistor TR4 is a battery voltage, the first processor 400 determines a battery short or first transistor TR1 and third transistor TR3 short failure.

As such, upon determination of one of the motor open failure, ground short failure, and battery short failure, the first processor 400 turns off the first cut-off switch SW1 and the second cut-off switch SW2 via the first driver module 500. Then, the first processor 400 applies a voltage to the node between the first transistor TR1 and the second transistor TR2 via the first driver module 500 and determines whether at least one of the first transistor TR1 and the second transistor TR2 has a battery short or ground short failure, according to the voltage measured by the first-1 monitoring section 311.

That is, the first processor 400 applies a voltage to the node between the first transistor TR1 and the second transistor TR2 via the first driver module 500 and detects the voltage actually applied to the node between the first transistor TR1 and the second transistor TR2 via the first-1 monitoring section 311.

At this time, if the voltage detected on the node between the first transistor TR1 and the second transistor TR2 is a battery voltage, the first processor 400 determines a battery short failure of the node itself, or a short circuit of the first transistor TR1. Also, if the voltage detected on the node between the first transistor TR1 and the second transistor TR2 is a ground voltage, the first processor 400 determines a ground short failure of the node itself, or a short circuit of the second transistor TR2.

This may be equally applied to the third transistor TR3 and the fourth transistor TR4. That is, the first processor 400 extracts the voltages of the third transistor TR3 and the fourth transistor TR4, based on what is confirmed after turning on the cut-off transistor and what is confirmed after checking the first transistor TR1 and the second transistor TR2. For example, when the first processor 400 turns on the cut-off transistor and confirms the failure of the first motor-driving module 100, and if the first transistor TR1 and the second transistor TR2 do not fail, the first processor 400 determines that the third transistor TR3 or the fourth transistor TR4 has failed. In this case, the first processor 400 determines that at least one of the third transistor TR3 and the fourth transistor TR4 has a battery short or ground short failure according to the voltage measured by the first-2 monitoring section 312. That is, if the voltage detected at the node between the third transistor TR3 and the fourth transistor TR4 is a battery voltage, the first processor 400 determines a battery short failure of the node itself, or a short failure of the third transistor TR3. If the voltage detected at the node between the third transistor TR3 and the fourth transistor TR4 is a ground voltage, the first processor 400 determines a ground short failure of the node itself, or a short failure of the fourth transistor TR4.

On the other hand, the method of determining a failure of the first motor-driving module 100 as described above may be equally applied to the second motor-driving module 200.

In another embodiment, the failure of the second motor-driving module 200 may be monitored using a pull-up source and a pull-down source.

Referring to FIG. 7, the second processor 600, via the second driver module 700, turns on the third cut-off switch SW3 and the fourth cut-off switch SW4, and turns off the first cut-off switch SW1 and the second cut-off switch SW2. At this time, a pull-up source and a pull-down source may be connected to the node between the fifth transistor TR5 and the sixth transistor TR6, or a pull-up source and a pull-down source may be connected to the node between the seventh transistor TR7 and the eighth transistor TR8.

The second processor 600 connects the pull-up source and the pull-down source to the node between the fifth transistor TR5 and the sixth transistor TR6 via the second driver module 700, and detects the voltage on the node between the seventh transistor TR7 and the eighth transistor TR8 in the second-2 monitoring section 322.

That is, with the pull-up source enabled, the second processor 600 determines that the second motor-driving module 200 is in a normal state if the voltage on the node between the seventh transistor TR7 and the eighth transistor TR8 is high. On the other hand, the second processor 600 determines that the second motor-driving module 200 has a motor open failure if the voltage on the node between the seventh transistor TR7 and the eighth transistor TR8 is different from the voltage of the pull-up source. The second processor 600 also determines that the second motor-driving module 200 has a ground short failure if the voltage on the node between the seventh transistor TR7 and the eighth transistor TR8 is low.

On the other hand, with the pull-down source enabled, the second processor 600 determines that the second motor-driving module 200 is in a normal state if the voltage on the node between the seventh transistor TR7 and the eighth transistor TR8 is low. On the other hand, the second processor 600 determines that the second motor-driving module 200 has a motor open failure if the voltage on the node between the seventh transistor TR7 and the eighth transistor TR8 is different from the voltage of the pull-down source. The second processor 600 also determines that the second motor-driving module 200 has a battery short failure if the voltage on the node between the seventh transistor TR7 and the eighth transistor TR8 is high (battery voltage). The second processor 600 also determines that the second motor-driving module 200 has a ground short if the voltage on the node between the seventh transistor TR7 and the eighth transistor TR8 is low when only the pull-up source is enabled.

This is shown in Table 1 below.

TABLE 1

| | Source state | | | |
| | Normal | Motor Open | GND Short | BATT Short |
| --- | --- | --- | --- | --- |
| Pull-up Enable | High | High | Low | High |

TABLE 1-continued

| | Source state | | | |
| | Normal | Motor Open | GND Short | BATT Short |
| --- | --- | --- | --- | --- |
| Pull-down Enable | Low | Low | Low | High |

If the second motor-driving module 200 is determined to have one of the motor open failure, ground short failure, and battery short failure as described above, the second processor 600 turns off the third cut-off switch SW3 and the fourth cut-off switch SW4 via the second driver module 700. Then, the second processor 600 applies a voltage to the node between the fifth transistor TR5 and the sixth transistor TR6 via the second driver module 700 and determines whether at least one of the fifth transistor TR5 and the sixth transistor TR6 has a battery short or ground short failure, according to the voltage measured by the second-1 monitoring section 321.

That is, the second processor 600 applies a voltage to the node between the fifth transistor TR5 and the sixth transistor TR6 via the second driver module 700 and detects the voltage actually applied to the node between the fifth transistor TR5 and the sixth transistor TR6 via the second-1 monitoring section 321.

At this time, the second processor 600 determines a battery short failure of the node itself, or a short circuit of the fifth transistor TR5 if the voltage detected on the node between the fifth transistor TR5 and the sixth transistor TR6 is a battery voltage. Also, the second processor 600 determines a ground short failure of the node itself, or a short circuit of the sixth transistor TR6 if the voltage detected on the node between the fifth transistor TR5 and the sixth transistor TR6 is a ground voltage.

This may be equally applied to the seventh transistor TR7 and the eighth transistor TR8. That is, the second processor 600 applies a voltage to the node between the seventh transistor TR7 and the eighth transistor TR8 via the second driver module 700 and determines whether at least one of the seventh transistor TR7 and the eighth transistor TR8 has a battery short or ground short failure, according to the voltage measured by the second-2 monitoring section 322. That is, if the voltage detected at the node between the seventh transistor TR7 and the eighth transistor TR8 is a battery voltage, the second processor 600 determines a battery short failure of the node itself, or a short failure of the seventh transistor TR7. Further, if the voltage detected at the node between the seventh transistor TR7 and the eighth transistor TR8 is a ground voltage, the second processor 600 determines that at least one of the seventh transistor TR7 and the eighth transistor TR8 has a ground short failure or a short failure of the eighth transistor TR8.

This method of determining a failure of the second motor-driving module 200 may be equally applied to the first motor-driving module 100.

In another embodiment, pull-up power and pull-down power may be applied to the first motor-driving module 100 and the second motor-driving module 200, respectively, to monitor the failure of the first motor-driving module 100 or the second motor-driving module 200.

Figure 8A:
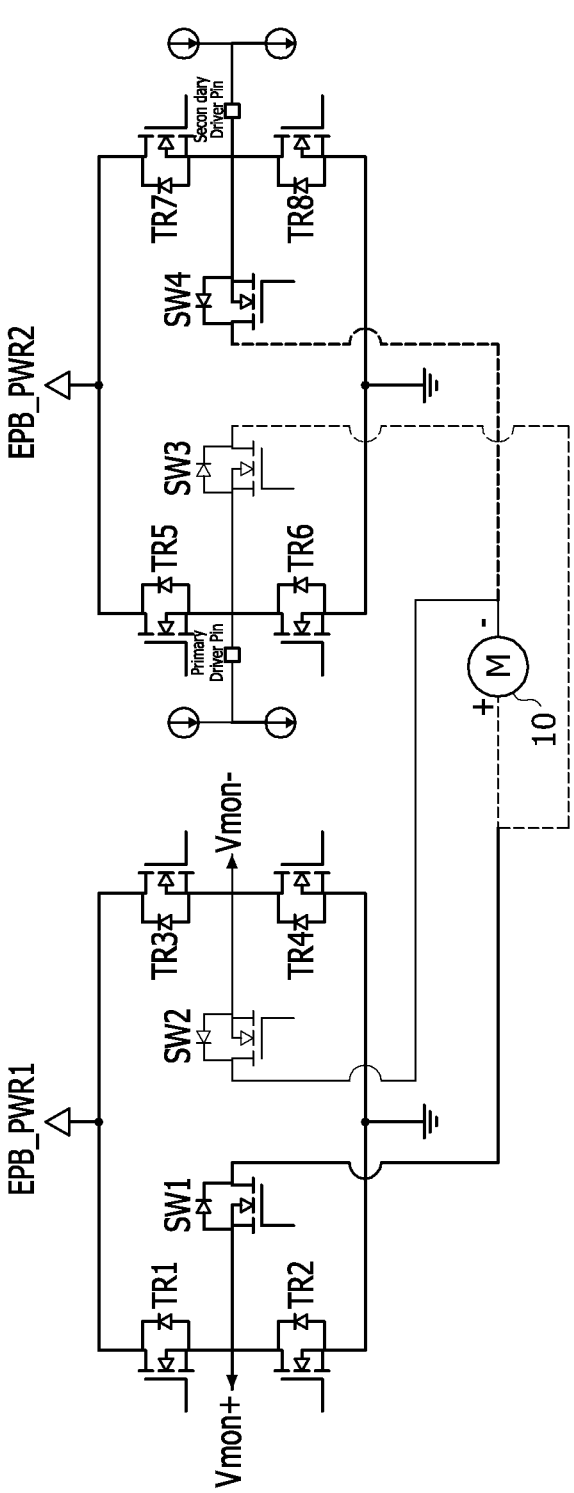

Referring to FIG. 8A, the first processor 400 turns off the first cut-off switch SW1 and turns on the second cut-off switch SW2 via the first driver module 500. The second processor 600 turns on the third cut-off switch SW3 and turns off the fourth cut-off switch SW4 via the second driver module 700.

At this time, a pull-up source and a pull-down source may be connected to the fifth transistor TR5 and the sixth transistor TR6 of the second motor-driving module 200. In this case, a failure of the first motor-driving module 100 may be monitored based on a voltage on the node between the third transistor TR3 and the fourth transistor TR4 of the first motor-driving module 100.

With the pull-up source enabled, the first processor 400 determines that the first motor-driving module 100 is in a normal state if the voltage on the node between the third transistor TR3 and the fourth transistor TR4 is high. On the other hand, the first processor 400 determines that the first motor-driving module 100 has a motor open failure if the voltage on the node between the third transistor TR3 and the fourth transistor TR4 is different from the voltage of the pull-up source. Further, the first processor 400 determines that the first motor-driving module 100 has a ground short failure if the voltage on the node between the third transistor TR3 and the fourth transistor TR4 is low.

On the other hand, with the pull-down source enabled, the first processor 400 determines that the first motor-driving module 100 is in a normal state if the voltage on the node between the third transistor TR3 and the fourth transistor TR4 is low. On the other hand, the first processor 400 determines that the first motor-driving module 100 has a motor open failure if the voltage on the node between the third transistor TR3 and the fourth transistor TR4 is different from the voltage of the pull-down source. Furthermore, the first processor 400 determines that the first motor-driving module 100 has a battery short failure if the voltage on the node between the third transistor TR3 and the fourth transistor TR4 is high (battery voltage).

This is shown in Table 2 below.

TABLE 2

| | Source state | | | |
| --- | --- | --- | --- | --- |
| | Normal | Motor Open | GND Short | BATT Short |
| Pull-up Enable | High | High | Low | High |
| Pull-down Enable | Low | High | Low | High |

Figure 8B:
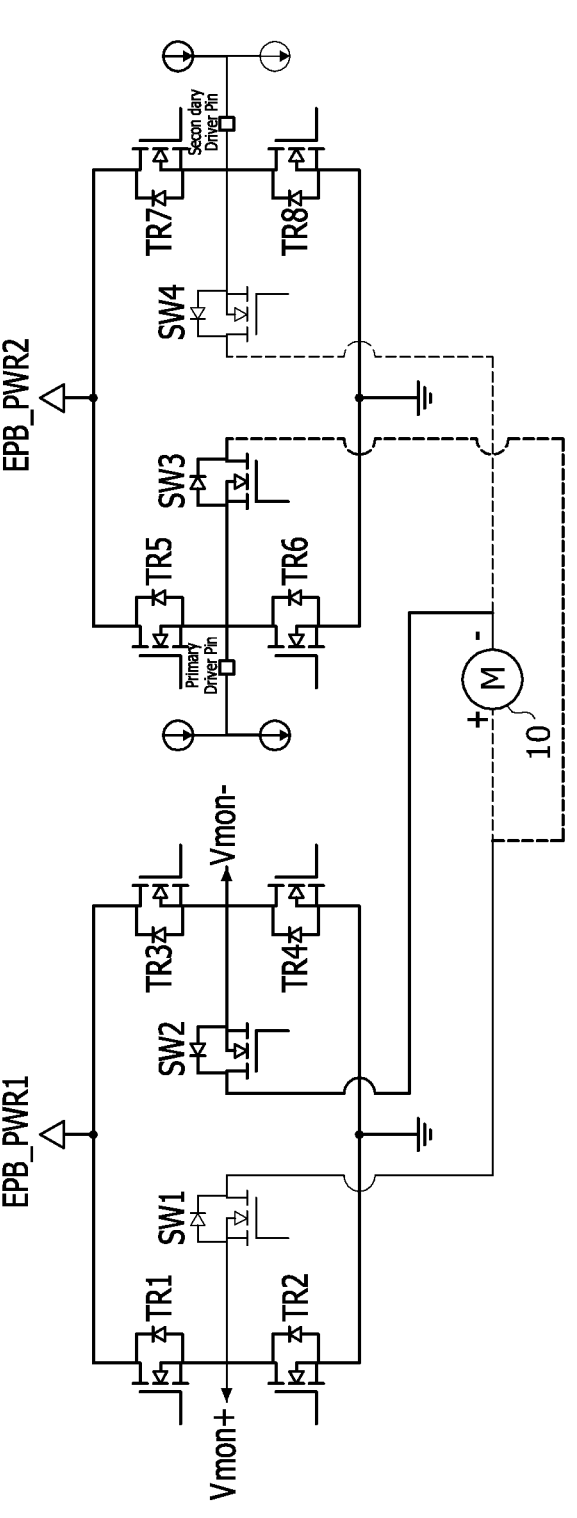

Referring to FIG. 8B, the first processor 400 turns on the first cut-off switch SW1 and turns off the second cut-off switch SW2 via the first driver module 500. The second processor 600 turns off the third cut-off switch SW3 and turns on the fourth cut-off switch SW4 via the second driver module 700.

At this time, a pull-up source and a pull-down source may be connected to the seventh transistor TR7 and the eighth transistor TR8 of the second motor-driving module 200. In this case, a failure of the first motor-driving module 100 may be monitored based on a voltage on the node between the first transistor TR1 and the second transistor TR2 measured by the first-1 monitoring section 311.

With the pull-up source enabled, the second processor 600 determines that the first motor-driving module 100 is in a normal state if the voltage on the node between the first transistor TR1 and the second transistor TR2 is high. On the other hand, the second processor 600 determines that the first motor-driving module 100 has a motor open failure if the voltage on the node between the first transistor TR1 and the second transistor TR2 is different from the voltage of the pull-up source. Further, the second processor 600 determines that the first motor-driving module 100 has a ground short failure if the voltage on the node between the first transistor TR1 and the second transistor TR2 is low.

On the other hand, with the pull-down source enabled, the second processor 600 determines that the first motor-driving module 100 is in a normal state if the voltage on the node between the first transistor TR1 and the second transistor TR2 is low. On the other hand, the second processor 600 determines that the first motor-driving module 100 has a motor open failure if the voltage on the node between the first transistor TR1 and the second transistor TR2 is different from the voltage of the pull-down source. Furthermore, the second processor 600 determines that the first motor-driving module 100 has a battery short failure if the voltage on the node between the first transistor TR1 and the second transistor TR2 is high (battery voltage).

This is shown in Table 3 below.

TABLE 3

| | Source state | | | |
| --- | --- | --- | --- | --- |
| | Normal | Motor Open | GND Short | BATT Short |
| Pull-up Enable | High | High | Low | High |
| Pull-down Enable | Low | High | Low | High |

On the other hand, if the second motor-driving module 200 is determined to have one of the motor open failure, ground short failure, and battery short failure as described above, the second processor 600 turns off the third cut-off switch SW3 and the fourth cut-off switch SW4. Then, the second processor 600 applies a voltage to the node between the fifth transistor TR5 and the sixth transistor TR6 and determines that at least one of the fifth transistor TR5 and the sixth transistor TR6 has a battery short or ground short failure, according to the voltage measured by the second-1 monitoring section 321.

That is, the second processor 600 applies a voltage to the node between the fifth transistor TR5 and the sixth transistor TR6 and detects the voltage actually applied to the node between the fifth transistor TR5 and the sixth transistor TR6 via the second-1 monitoring section 321.

At this time, if the voltage detected at the node between the fifth transistor TR5 and the sixth transistor TR6 is a battery voltage, the second processor 600 determines that at least one of the fifth transistor TR5 and the sixth transistor TR6 has a battery short failure. Further, the second processor 600 determines that at least one of the fifth transistor TR5 and the sixth transistor TR6 has a ground short failure if the voltage detected at the node between the fifth transistor TR5 and the sixth transistor TR6 is a ground voltage.

This may be equally applied to the seventh transistor TR7 and the eighth transistor TR8. That is, the second processor 600 applies a voltage to the node between the seventh transistor TR7 and the eighth transistor TR8 and determines whether at least one of the seventh transistor TR7 and the eighth transistor TR8 has a battery short or ground short failure, according to the voltage measured by the second-2 monitoring section 322. That is, the second processor 600 determines that at least one of the seventh transistor TR7 and the eighth transistor TR8 has a battery short failure if the voltage detected at the node between the seventh transistor TR7 and the eighth transistor TR8 is a battery voltage. Further, if the voltage detected at the node between the seventh transistor TR7 and the eighth transistor TR8 is a ground voltage, the second processor 600 determines that at least one of the seventh transistor TR7 and the eighth transistor TR8 has a ground short failure.

This method of determining a failure of the second motor-driving module 200 may be equally applied to the first motor-driving module 100.

What is claimed is:

1. A motor driving redundancy device for an electronic parking brake, the device comprising:
   a first motor-driving module configured to supply current to a motor;
   a first driver module configured to control the first motor-driving module;
   a second motor-driving module configured to drive the motor;
   a second driver module configured to control the second motor-driving module;
   a monitoring module configured to monitor a status of the first motor-driving module and the second motor-driving module; and
   a processor configured to, when a failure is detected in either the first motor-driving module or the second motor-driving module by the monitoring module, control at least one of the first motor-driving module or the second motor-driving module to drive the motor.

2. The motor driving redundancy device of claim 1, wherein the first motor-driving module comprises: first to fourth transistors constituting a first H-bridge circuit; a first cut-off switch configured to cut off current applied to the motor from the first transistor and the second transistor; and a second cut-off switch configured to cut off current applied to the motor from the third transistor and the fourth transistor, and
   the second motor-driving module comprises: fifth to eighth transistors constituting a second H-bridge circuit; a third cut-off switch configured to cut off current applied to the motor from the fifth transistor and the sixth transistor; and a fourth cut-off switch configured to cut off current applied to the motor from the seventh transistor and the eighth transistor.

3. The motor driving redundancy device of claim 2, wherein the processor is configured to, when a failure occurs in at least one of the first transistor or the second transistor, control the fifth transistor and the sixth transistor, and the third transistor and the fourth transistor, or otherwise the second motor-driving module to drive the motor.

4. The motor driving redundancy device of claim 2, wherein the processor is configured to, when a failure occurs in at least one of the third transistor or the fourth transistor, control the seventh transistor and the eighth transistor, and the first transistor and the second transistor, or otherwise the second motor-driving module to drive the motor.

5. The motor driving redundancy device of claim 2, wherein the monitoring module comprises:
   a first monitoring section configured to monitor a status of the first transistor to the fourth transistor; and
   a second monitoring section configured to monitor a status of the fifth transistor to the eighth transistor.

6. The motor driving redundancy device of claim 5, wherein the first monitoring section comprises: a first-1 monitoring section connected to a first power input of the motor via a node between the first transistor and the second transistor; and a first-2 monitoring section connected to a second power input of the motor via a node between the third transistor and the fourth transistor, and the second monitoring section comprises: a second-1 monitoring section connected to a first power input of the motor via a node between the fifth transistor and the sixth transistor; and a second-2 monitoring section connected to a second power input of the motor via a node between the seventh transistor and the eighth transistor.

7. The motor driving redundancy device of claim 2, wherein the processor is configured to control the first driver module to apply a voltage to one side of the first H-bridge circuit of the first motor-driving module and to determine a failure of the first motor-driving module depending on a voltage on the other side of the first H-bridge circuit, detected by the monitoring module, or
   the processor is configured to control the second driver module to apply a voltage to one side of the second H-bridge circuit of the second motor-driving module and to determine a failure of the second motor-driving module depending on a voltage on the other side of the second H-bridge circuit, detected by the monitoring module.

8. The motor driving redundancy device of claim 2, wherein the processor is configured to control the first driver module to connect a pull-up source to one side of the first H-bridge circuit of the first motor-driving module and to determine a failure of the first motor-driving module depending on a voltage on the other side of the first H-bridge circuit, detected by the monitoring module, or
   the processor is configured to control the second driver module to connect a pull-up source to one side of the second H-bridge circuit of the second motor-driving module and to determine a failure of the second motor-driving module depending on a voltage on the other side of the second H-bridge circuit, detected by the monitoring module.

9. The motor driving redundancy device of claim 2, wherein the processor is configured to control the first driver module to connect a pull-down source to one side of the first H-bridge circuit of the first motor-driving module and to determine a failure of the first motor-driving module depending on a voltage on the other side of the first H-bridge circuit, detected by the monitoring module, or
   the processor is configured to control the second driver module to connect a pull-down source to one side of the second H-bridge circuit of the second motor-driving module and to determine a failure of the second motor-driving module depending on a voltage on the other side of the second H-bridge circuit, detected by the monitoring module.

10. The motor driving redundancy device of claim 7, wherein the processor is configured to:
   when the first motor-driving module is in a failure condition, determine a failure of at least one of the first transistor to the fourth transistor after turning off at least one of the first cut-off switch or the second cut-off switch; or
   when the second motor-driving module is in a failure condition, determine a failure of at least one of the fifth transistor to the eighth transistor after turning off at least one of the third cut-off switch or the fourth cut-off switch.

\* \* \* \* \*